(No Model.)
F. ECAUBERT.
BRAKE FOR BICYCLES, &c.
No. 597,539.    Patented Jan. 18, 1898.
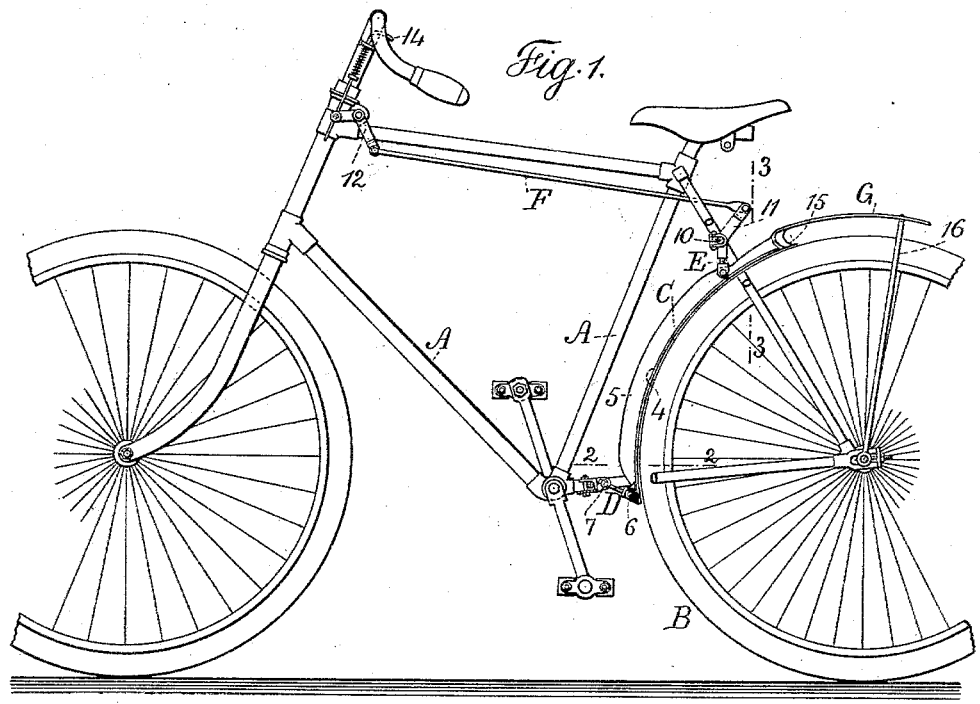
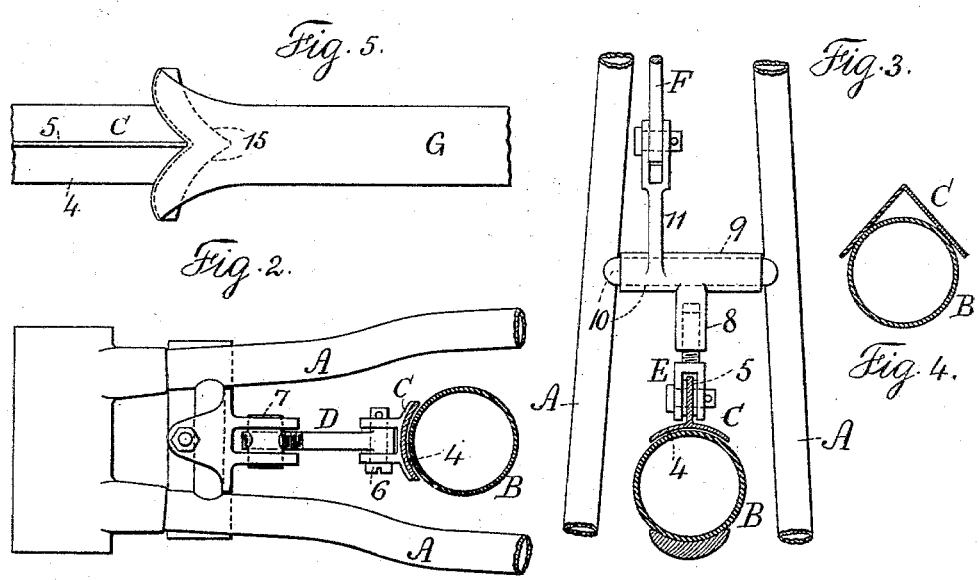
Witnesses:
J. Staib
Chas. H. Smith
Inventor:
F. Ecaubert
per L. W. Serrell & Son
Attys

UNITED STATES PATENT OFFICE.

FREDERIC ECAUBERT, OF BROOKLYN, NEW YORK.

BRAKE FOR BICYCLES, &c.

SPECIFICATION forming part of Letters Patent No. 597,539, dated January 18, 1898.

Application filed January 24, 1896. Serial No. 576,632. (No model.)

*To all whom it may concern:*

Be it known that I, FREDERIC ECAUBERT, a citizen of the United States, residing at Brooklyn, in the county of Kings and State of New York, have invented an Improvement in Brakes for Bicycles and other Vehicles, of which the following is a specification.

In applying brakes to the rubber or pneumatic tires in the wheels of vehicles, such as bicycles, it has heretofore been usual to round the ends of the brake-shoe or to flare them outwardly. The result is that stones or any pieces of sharp material that may adhere to the surface of the tire are carried beneath the brake and thereby driven into the india-rubber surface. Hence such surface is often injured, and in addition to this the extent of bearing of the brake-shoe upon the pneumatic tire is limited, and the pressure causes the brake-shoe to embed itself or to compress such tire to a considerable extent, and the brake-shoe is liable to spring or bend, because the pressure is usually applied at the middle portion only.

One object of the present invention is to scrape off and remove from the india-rubber surface foreign substances without injuring the surface of the tire and to throw these substances outwardly and in such a direction as not to come into contact with the person or clothing, and another object is to extend the brake-shoe and employ two or more pressing devices, so as to make the shoe operative with uniformity on a large area for obtaining the necessary friction without the risk of injury to the tire by the brake-shoe being embedded at one place.

In carrying out this invention the brake-shoe is made as a concave segment coinciding to the exterior surface of the tire, or nearly so, and extending along the same for a considerable distance, and this bearing-surface is strengthened and stiffened by an outwardly-projecting rib. The ends of the brake-shoe are connected to the frame of the machine by swinging links, which preferably are made adjustable to vary the action of the links and cause the brake-shoe to take a proper bearing upon the surface of the tire, and one end of the brake-shoe is shaped somewhat like a plowshare and it usually corresponds to the exterior surface of the tire, so as to underrun and throw off any particle of sand, gravel, or other material that may adhere to the surface of the tire, and a shield directs such materials away from the person and clothing, and a lever-handle is made use of for swinging one of the links, the other link being preferably automatic in its action as the brake-shoe receives an endwise movement from the first link. The brake-shoe acts as a mud-guard, and it is also provided with an extension that is simply a guard.

In the drawings, Figure 1 is a side view representing a portion of a bicycle to which the present improvement is applied. Fig. 2 is a sectional plan, in larger size, at the line 2 2. Fig. 3 is a sectional elevation at the line 3 3. Fig. 4 is a cross-section showing a brake-shoe of different shape to that in Fig. 3, and Fig. 5 is a plan view showing the point of the brake-shoe.

The frame A of the machine is to be of any desired character. I have represented the improved brake as applied to the rear wheel B of the machine. The brake-shoe C is preferably made with a concave surface 4, adapted to fit upon the curved surface of the rubber tire and to extend around the forward upper part of the wheel, as illustrated in Fig. 1, to take a sufficient bearing, and the brake-shoe is stiffened by a rib 5 at the back thereof, so as to obtain the necessary strength and lightness in the brake-shoe.

If the brake-shoe is V-shaped in section, as seen in Fig. 4, it will take a bearing upon the pneumatic tire at the sides of the portion that is exposed to wear by contact with the roadway. At one end of the shoe the link D is connected pivotally at 6 to the shoe and at 7 to the frame, and the link itself is adjustable, so as to compensate for wear and cause the brake-shoe on this end to press properly upon the surface of the wheel by the swinging of the link upon its pivots as the brake-shoe receives an endwise movement, as hereinafter illustrated. I prefer to make the link in the form of a screw with an eye at one end for the pivotal pin 6, that unites the eye to a jaw on the brake-shoe, and the screw of the link is made to pass through a nut formed by the pivot-pin 7, so that the parts can be adjusted by separating the pivot-pin 6 and rotating the link in the nut formed by the pin 7. The screw-link D, passing through the pin 7, cannot become loose or detached, because the threaded part of the link is between the jaws, and the parallel-sided pin is passed through the holes in the jaws before the link is screwed into it. Hence lock-nuts and other complicated retaining devices are dispensed with, and the adjustment can easily be made to regulate the action of the link on the brake-shoe. The connecting-link E at the other end of the brake-shoe C is similarly constructed to the link D so far as being made with a screw-shank entering a nut for varying the effective length of the link; but this nut 8 is preferably made as an arm extending from a rock-shaft 9, that is sometimes tubular and upon a pivotal cross-bar 10, and it is provided with an arm 11, to which suitable power is applied for turning the rock-shaft 9 and moving the brake-shoe C endwise by the action of the link E extending out from the tubular nut upon the rock-shaft, and the pivots of the links D and E are in such positions that the links stand diagonal, and the aforesaid end movement causes the brake-shoe to be carried bodily toward the pneumatic tire, and the parts are so adjusted that the desired pressure can be given to the tire of the wheel by the action of the brake, and the tension at the upper end of the brake-shoe tends to make the curved shoe bear uniformly upon the tire.

Any desired mechanism may be employed for acting upon the arm 11 in applying and releasing the brake. I, however, have represented a connecting-rod F, extending from the outer end of the arm 11 to a bent lever 12, pivoted upon the frame near the handle-bar tube, and this lever 12 may have a handle or link 14, by which it can be partially moved to act through the connecting-rod F upon the arm 11 in applying or releasing the brake-shoe C.

In consequence of the brake-shoe being applied to the front portion of the hind wheel it takes the place of a mud-guard, and the upper end of such brake-shoe will be above the tire and approximately central over the axle of the rear wheel, and the surface of the tire when the bicycle is in use will be moving toward the upper end of the brake-shoe. I make the upper end of this brake-shoe V-shaped or approximately like a double moldboard-plow, as shown in Fig. 5, and the edge of the moldboard is pressed closely against the surface of the pneumatic tire when the brake is applied, so as to scrape off and throw outwardly any foreign substances that may adhere to the tire and thus prevent such substances running in between the tire and the brake-shoe, and there is a guard G extending upwardly and backwardly from the scraping-point 15, so as to prevent any substance that is scraped from the surface of the tire by the scraper 15 flying upwardly against the rider or his clothing, and there is a free delivery of such materials at each side of the scraping-point 15. Hence there is little or no risk of the scraper becoming obstructed or failing to operate properly in removing obstructions that adhere to the tire. This guard G may extend to the rear any desired distance and prevents mud being thrown upon the rider. A flexible brace 16 may be used to sustain the rear end of this guard.

It will be observed that the links to which the brake-shoe is connected near its ends extend outward and stand at equal or nearly equal angles to the radial lines of the wheels. Hence when the link at one end is swung and a movement given to the brake-shoe the link at the other end carries the brake-shoe to an equal extent either inward toward the wheel or out from the wheel, and hence the action of the brake-shoe is uniform, and in addition to this the arrangement herein shown and which I prefer applies a tension to the arc-shaped brake-shoe, which, tending to spring the shoe toward a straight line, causes the shoe to press equally, or nearly so, throughout its length against the wheel, and the scraping end of the shoe being a prolongation beyond the place of attachment of the link is not caused to scrape the elastic tire unduly, but, on the contrary, any spring in the brake-shoe tends to lessen the pressure at the extreme point of the scraper.

I claim as my invention—

1. The combination with the wheel, of a brake-shoe to act upon the wheel, a mud-guard out of contact with the wheel and connected at one end to the brake, and a scraper at the end of the brake-shoe and between the same and the mud-guard, substantially as specified.

2. The combination with the wheel having an elastic tire, of a brake-shoe extending partially around such tire, and a plow-shaped scraper at the end of the brake-shoe for removing earthy materials from the surface of the elastic tire and preventing the same passing under the brake-shoe, substantially as set forth.

3. The combination with the wheel having an elastic tire, of a brake-shoe extending partially around the tire and a plow-shaped scraper at the end of the brake-shoe for removing earthy materials from the surface of the elastic tire, and a mud-guard connected at one end to the plow-shaped scraper and extending to the rear over the wheel, substantially as set forth.

4. The combination with a brake-shoe adapted to fit the wheel-tire, of two links swinging upon fixed pivots and pivotally connected at their swinging ends to the brake-shoe, each link having a screw for adjusting its operative length and causing the brake-shoe to take a proper bearing upon the wheel, substantially as set forth.

5. The combination with the wheel in a vehicle, of a brake-shoe concave on one side and having a stiffening-rib at the back, a link and a pivotal connection at one end to the brake-shoe, the other end of the link being screw-threaded, and a nut into which the screw-threaded portion of the link passes and upon which the link can be swung, substantially as set forth.

6. The combination with the wheel in a vehicle, of a brake-shoe concave on one side and having a stiffening-rib at the back, a link and a pivotal connection at one end to the brake-shoe, the other end of the link being screw-threaded, and a nut into which the screw-threaded portion of the link passes and upon which the link can be swung, a screw-threaded link and pivotal connection near the other end of the brake-shoe, a pivoted arm receiving the screw-threaded link and an arm for giving motion to the pivoted arm to apply or relieve the brake, substantially as set forth.

7. The combination with a wheel having an elastic tire, of a brake-shoe extending partially around the wheel, a lever and link pivoted upon the frame and to the brake-shoe and standing at an angle to the radial line of the wheel, and another link pivoted to the frame and to the brake-shoe and standing at a similar angle to the radial line of the wheel, outside the brake-shoe, whereby an end movement communicated to the brake-shoe by the link-lever causes a movement of the brake toward or from the wheel of a substantially uniform extent at both ends of the brake-shoe, substantially as set forth.

8. The combination with the wheel in a bicycle, of a brake-shoe, diagonal links for connecting the end portions of the brake-shoe to the frame, a scraper at one end of the brake-shoe, and a mud-guard connected at one end to the scraper upon the brake-shoe and extending to the rear, and a yielding brace supporting the rear end of the mud-guard, substantially as specified.

9. The combination with the frame and wheel having an elastic tire, of a brake-shoe extending partially around the wheel, a lever pivoted upon the frame and having a link connected to the brake-shoe for moving the brake-shoe away from the wheel or pressing the brake-shoe to the wheel and holding the same against the tension upon the brake-shoe by contact with the wheel, and mechanism substantially as specified, applied near the other end of the brake-shoe for giving to such brake-shoe a corresponding movement toward or from the wheel whereby the brake-shoe is made to press with nearly uniform force upon the wheel throughout its entire length, substantially as specified.

Signed by me this 21st day of January, 1896.

F. ECAUBERT.

Witnesses:
GEO. T. PINCKNEY,
S. T. HAVILAND.